United States Patent [19]

Crosby

[11] Patent Number: 5,268,191
[45] Date of Patent: * Dec. 7, 1993

[54] POURABLE SHORTENING CONTAINING LAURIC FAT AND METHOD FOR PREPARING SAME

[75] Inventor: Thomas G. Crosby, Bourbonnais, Ill.

[73] Assignee: Bunge Foods Corporation, Bradley, Ill.

[*] Notice: The portion of the term of this patent subsequent to Oct. 9, 2007 has been disclaimed.

[21] Appl. No.: 773,671

[22] Filed: Oct. 7, 1991

[51] Int. Cl.$^5$ .............................................. A23D 9/00
[52] U.S. Cl. ..................... 426/606; 426/601; 426/607; 426/663
[58] Field of Search ............... 426/606, 601, 607, 663, 426/608

[56] References Cited

U.S. PATENT DOCUMENTS 1,432,632 10/1922 Stevens et al. .................. 426/585
3,488,198 1/1970 Bundus ............................ 426/585
4,961,951 10/1990 Crosby ............................ 426/602

Primary Examiner—Joseph Golian
Assistant Examiner—Evan Federman
Attorney, Agent, or Firm—Lockwood, Alex, Fitzgibbon & Cummings

[57] ABSTRACT

Shortening compositions containing a lauric fat component such as coconut oil are provided in a form in which they are pourable and which have a eutectic characteristic wherein the solids content of the shortening composition is lower than the combined respective solids contents of the individual ingredients thereof, including a shortening base liquid edible oil component, the lauric fat component and, when desired, a flake component.

20 Claims, 2 Drawing Sheets

POURABLE SHORTENING CONTAINING LAURIC FAT AND METHOD FOR PREPARING SAME

DESCRIPTION

BACKGROUND AND DESCRIPTION OF THE INVENTION

The present invention generally relates to shortening compositions that contain substantial quantities of a lauric fat and that are flowable or pourable at room temperature or below. More particularly, the pourable shortening compositions according to this invention contain substantial quantities of a lauric fat component such as coconut oil to provide the flavoring and advantageous properties and characteristics associated with coconut oil without the disadvantage of having such composition be solid or only pumpable, as opposed to readily pourable, at ambient temperatures such as room temperature or even below. These compositions are formulated so as to provide a system which is pourable without having to be heated to above room temperature. The pourable compositions according to the invention exhibit a eutectic solids profile at relatively low temperatures.

Shortening products which are easy to handle and convenient to store have been developed over the years in an effort to provide cooking or griddle shortenings which are readily pourable so as to be easy to handle, for example during use by institutional cooks during food preparation. Pourable products are also sought as substitutes for butter or margarine because they are more convenient to use and store and are less expensive than whole, real butter. Pourable products have been formulated in the past. At times, such products have been proposed to include lauric fats such as coconut oil in order to utilize the advantageous properties and characteristics normally associated with coconut oil and other lauric fats, most notably their ability to withstand the rigors of high heat pan frying. Lauric fats which are solid at room temperature are known to provide protection from undesirable deterioration of a shortening during high heat uses. Such deterioration can be manifested by the development of gimming, by varnish formation, by the onset of discoloration and the like. Griddle or frying shortenings containing substantial quantities of solid lauric fats are associated with cleaner frying operations. These types of prior shortening products themselves take on substantially solid forms, including stick or whipped products, or perhaps products that can be pumped, such as those having the handling properties, consistency or viscosity of unhydrogenated peanut butter or viscous latex paint. They are not pourable at room temperature or below, some of them being in the nature of non-pourable plastic compositions that are distributed in tins, tubs or other wide-mouthed containers.

In accordance with the present invention, not only are shortening compositions provided which contain a lauric fat component, but also they exhibit pourability at room temperature or below. An edible liquid base shortening component comprises a majority of the shortening composition according to this invention, which further include up to as much about 30 weight percent or more of a lauric fat component such as coconut oil. These compositions exhibit a eutectic solid profile wherein the solids content of the composition is lower—at a given temperature, including temperatures below room temperatures—than the sum of the respective solids contents of the individual components of the composition according to the invention.

It is accordingly a general object of the present invention to provide an improved pourable shortening composition that contains coconut oil or other lauric fat.

Another object of this invention is to provide an improved shortening composition that is pourable at room temperature or even lower and which includes substantial amounts of coconut oil in a eutectic combination with liquid shortening components.

Another object of the present invention is to provide an improved shortening for high heat applications which is pourable yet withstands the rigors of high heat cooking and the like.

These and other objects, features and advantages of this invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
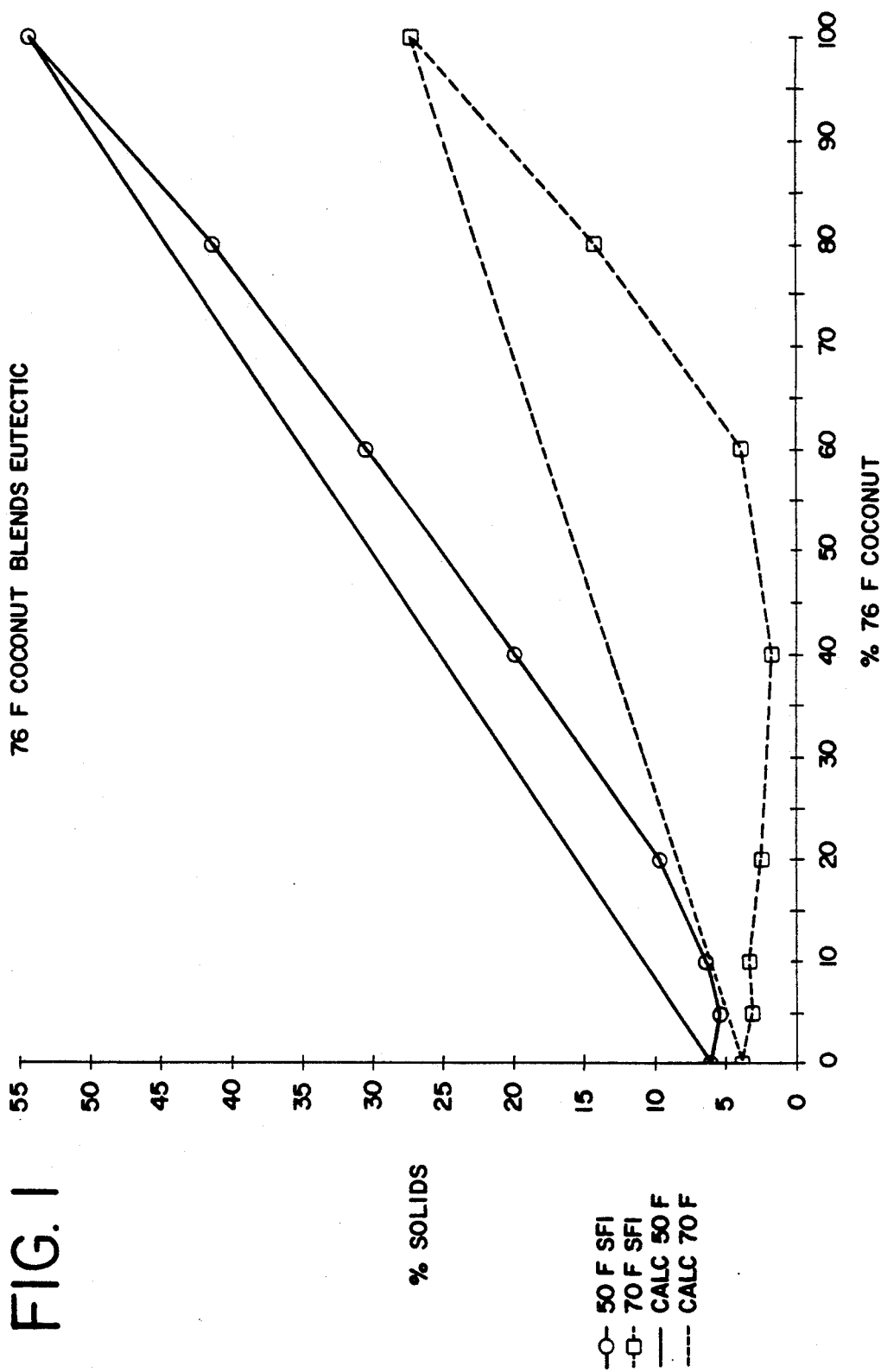
FIG. 1 is a plot of data illustrating the eutectic effect of the present invention which incorporates a normal coconut oil lauric fat component.

Shortening compositions according to this invention include an edible oil shortening base component that comprises well in excess of one half of the shortening composition on a weight percent basis, such being typically at least about 70 weight percent of the shortening composition. The shortening composition further includes substantial quantities of a lauric fat component, typically between about 5 and about 30 weight percent, based upon the total weight of the shortening composition, preferably between about 5 and about 25 weight percent.

The lauric fat component typically will have a plurality of fatty acids reflecting the natural makeup of the lauric fat. For example, although a large percentage of coconut oil has a twelve carbon atom fatty acid structure, other fatty acid structures generally ranging between 8 and 18 carbon atoms can be present. Generally speaking, the lauric fat component such as coconut oil is a semi-solid lard-like fat having a melting point which is above room temperature. Depending upon the specific makeup of the lauric fat component, the melting point can range generally between about 70° and about 100° F. (approximately 21° C. to approximately 38° C.).

With more particular reference to the lauric fat component, this is a component including substantial quantities of lauric fat, such as coconut oil, palm kernel oil, babassu, tucum, and the like, or combinations thereof. Often these lauric fat components will include at least about 70 percent by weight, in total, of fatty acid components having carbon chain lengths of 8, 10, 12 or 14.When the lauric fat component is in the lower portion of these melting point ranges, it is of a softer consistency, whereas the higher melting point lauric fat components have a firmer consistency. Typically, the shortening compositions can include greater percentages of the lower melting point lauric fat components than of the higher melting point lauric fat components, which preferably would be present at no greater than about 25 weight percent, based on the total weight of the shortening composition. The preferred lauric fat component is substantially pure coconut oil having a fatty acid composition including in excess of 40% lauric chain lengths. A coconut oil lauric fat component typically will make up between about 10 and about 30 weight percent, and may be between about 5 and about 15 weight percent, based upon the total weight of the shortening composition.

The liquid shortening component provides the edible oil base for the shortening composition. This base shortening component, although liquid, can itself have a solids content, which should be sufficiently low so as to facilitate the maintenance of a fluid or pourable shortening composition product. Exemplary liquid base shortening components in this regard are those which include pourable vegetable oils such as soybean oil, corn oil, rapeseed or canola oil, sunflower oil, safflower oil, olive oil, cottonseed oil, winterized oils and the like. They may be lightly hydrogenated, typically having an Iodine Value of about 85 or above, preferably about 90 or above. Such liquid base shortening component can, if desired, also include a minor amount of a hard fat material or flake component, for example soy flake or other non-pourable forms of soybean, rapeseed, corn oil and the like, typically only those which form beta crystals. A typical flake component is a vegetable oil which has been hydrogenated or hardened to an Iodine Value not greater than about 5. Such flake component, when present, should comprise a relatively low percentage of the liquid base shortening component, typically not more than about 12 weight percent of the liquid base-shortening component, preferably less than about 8 weight percent, and most preferably about 6 weight percent or less of the liquid base shortening component.

These liquid base shortening components will comprise as low as about 70 weight percent or less of the pourable shortening composition and could comprise as much as approximately 95 weight percent thereof. The preferred range is between about 85 and about 95 weight percent of the complete shortening composition, with the lauric fat component being between about 5 and about 15 weight percent, both based upon the total weight of the composition.

The pourable compositions according to the present invention can include additional components such as water, salts, preservatives, emulsifiers, anti-foaming agents, coloring agents, protein sources, artificial flavors, sugars, starches, and the like, and combinations thereof.

Exemplary salts that can be included within the shortening composition will typically be those that enhance the taste of the shortening composition while also assisting in maintaining its stability, if necessary, even when stored under non-refrigerated conditions. Inorganic salts, organic salts and treated salts may be used. Sodium chloride, calcium chloride, potassium chloride, sea salt, monosodium glutamate and treated salts may be used, either alone or in combination. An example of a treated salt is sodium chloride treated with calcium disodium ethylenediaminetetraacetic acid salt, which is additionally useful to chelate any active, pro-oxidant heavy metal that may find its way into the shortening composition. Depending upon the particular salt, the shortening composition may include up to about 4 weight percent thereof, typically substantially less than this amount.

Preservatives in addition to salts may also be included. Well-known preservatives in this regard include sodium benzoate, potassium sorbate and the like. In addition, these preservatives can function as mold inhibitors and can also, when in acidic form, assist in maintaining a lowered pH value. Closely associated components which may be included in the eutectic compositions are characterized as antioxidants. Some known antioxidants which are useful in this regard include butylated hydroxyanisole (BHA), butylated hydroxytoluene (BHT), tertiary butyl hydroquinone (TBHQ), propyl gallate, and the tocopherols including alpha-tocopherol or vitamin E. Generally speaking, these various additives will be included at low levels, typically not more than about 1 weight percent, based on the total weight of the shortening composition.

Edible organic acids can be included in the shortening compositions, whether added to the composition as an acid or formed from organic salt preservatives within the composition. Such acids are useful in adjusting the pH if desired in order to assist in blending components of the shortening composition and in order to enhance shelf stability, if needed. A typical shortening composition according to this invention will have a pH within the range of between about 5 and about 7.

It is often advantageous to include an emulsifier within the shortening composition. Emulsifiers such as lecithin, as well as monoglycerides and diglycerides, can be included at customary, as needed, levels. Typically these range between about 0.5 and about 2 weight percent. Lecithin is also known to impart anti-sticking properties to the shortening composition. Anti-foaming agents, such as dimethylpolysiloxane, can be included to improve the handling properties of the shortening composition, particularly during blending thereof. Anti-foaming agents are added in amounts as needed, and these amounts can be between about 0.0001 and about 0.001 weight percent, based upon the total weight of the shortening composition. Coloring agents such as beta-carotene can also be included at customary levels in order to impart a yellow coloration to the shortening composition. For example, between about 0.001 and about 0.01 weight percent of a thirty percent beta-carotene component may be included. Artificial and/or natural flavors, such as butter flavors, could also be added when desired. Such flavoring components are generally known in the art and may be included at typical levels, such as between about 0.005 and about 0.2 weight percent, or until a desired degree of flavor enhancement is achieved.

When there is a desire to do so, a source of protein or nitrogen can be included. Such nitrogen sources include dairy components, for example non-fat dry milk solids, other milk materials, cream, whey, and the like. When these are included, they should be kept at relatively low percentages.

The shortening compositions are made by standard procedures used for manufacturing edible oil products. Such procedures effect a blending of the various desired components together, which typically can include running them through a pumping apparatus and into a wiped film or scraped wall heat exchanger, which typically lowers the temperature of the components to below that which was developed during the blending operation. These procedures and others are well-known in the art, as exemplified by U.S. Pat. Nos. 2,815,285, 3,595,674 and 3,857,985, the subject matter thereof being incorporated by reference hereinto.

With the shortening systems according to the invention, the solids fat index value of the pourable composition is significantly lower than the sum of the respective solids fat index values of the edible liquid shortening base component and of the lauric fat component, that is there is a eutectic solids profile exhibited, at ambient temperatures, for example at between about 50° F. and about 80° F., preferably between about 50° F. and about 70° F. The solids fat index value of the pourable shortening composition is at least about 10% lower than this sum of the respective solids fat index values. Same can be at least about 20% lower or as much as at least about 35% lower.

Compositions formulated according to the present invention were subjected to testing in order to illustrate the eutectic solids profile thereof. Details in this regard are provided in the following examples.

EXAMPLE 1

A pourable shortening composition containing coconut oil as the lauric fat was prepared by blending a soybean oil based shortening with coconut oil and measuring the solids fat index (SFI) at 50° F., 70° F., 80° F., 92° F. and 104° F. The SFI values were determined according to the standard procedure of the American Oil Chemists Society (AOCS). The soybean oil-based shortening composition was composed primarily of partially hydrogenated soybean oil blend having an Iodine Value of 95.3, the blend including about 3% soy flake. The lauric fat component exhibited a 76° F. melting point and had an Iodine Value of 8.5. The soybean oil blend component and the coconut oil lauric fat component were combined at a ratio of 90 to 10, and the resulting blend had an Iodine Value of 88.2. Solids fat index (SFI) values at the five temperatures for the soybean oil component and of the lauric fat component alone are reported alone and of the lauric fat component alone in Table I. Also reported therein are the actually measured SFI values of the 90:10 blends, as well as the calculated SFI values for these blends. The calculated SFI values were determined from the 100% SFI values by suitable pro-rata calculations using 90% of the soybean oil component SFI value and 10% of the coconut oil lauric fat component SFI value.

TABLE I

| | Solids Fat Index Values | | | |
|---|---|---|---|---|
| Temperature | SFI of Soybean Oil Component | SFI of Lauric Fat Component | Measured SFI of Blend | Calculated SFI of Blend |
| 50° F. | 8.2 | 54.2 | 7.6 | 12.8 |
| 70° F. | 5.4 | 27.3 | 4.7 | 7.6 |
| 80° F. | 5.2 | 0.1 | 4.8 | 4.7 |
| 92° F. | 4.1 | 0.1 | 3.9 | 3.7 |
| 104° F. | 3.2 | 0.0 | 3.2 | 2.9 |

Information regarding the fatty acid makeup of the soybean oil component and of the coconut oil lauric fat component, as well as of the 90:10 blend, are providing in Table II.

TABLE II

| Fatty Acid | % In Soybean Oil Component | % In Lauric Fat Component | % In 90:10 Blend |
|---|---|---|---|
| C8 | — | 5.9 | 0.6 |
| C10 | — | 5.4 | 0.5 |
| C12 | — | 45.4 | 4.5 |
| C14 | 0.1 | 18.0 | 1.8 |
| C16 | 10.5 | 9.1 | 10.2 |
| C18 | 6.9 | 2.7 | 6.5 |
| C18:1 | 50.8 | 9.4 | 45.3 |
| C18:2 | 28.9 | 3.0 | 27.5 |
| C18:3 | 1.5 | 0.3 | 1.5 |
| All other | 1.3 | 0.8 | 1.6 |

A plot of the blend's calculated SFI data in Table I would be substantially linear, while a plot of the measured SFI data would illustrate a significant eutectic curve. Particularly at the lower temperatures, the actually measured percent solids is significantly lower than the calculated percent solids. Especially at 70° F. and 50° F., approximating room temperature and below, the actual percent solids of the total composition including both the lauric fat component and the soybean oil component is substantially less than what would be expected absent the eutectic characteristic of the present invention. At these important SFI temperatures of 50° F. and 70° F., the actually measured SFI values were approximately 40% lower and 38% lower, respectively, than the corresponding calculated values. This is not true at the temperatures above the melting point of the coconut oil lauric fat component, due to the fact that the lauric fat component was completely molten or nearly so at these higher temperatures, which dramatically decreases the melting point of the blend, this being expected somewhat from the SFI of the coconut oil lauric fat component at these temperatures, which are reported in Table I.

EXAMPLE 2

A blend of 87.3% partially hydrogenated soybean oil, 2.7% soy flake and 10% coconut oil having a melting point of about 76° F. were mixed and melted in a tank at a temperature in excess of the melting point of the blend, namely about 124° F. The melted blend was then pumped through a scraped surface heat exchanger in order to chill the hot liquid oil to a temperature on the order of 77° F. This flowed to a conduit having an enlarged portion or bulge having an agitated shaft and mechanical fingers therewithin. This conduit provides a generally mild mixing action to facilitate crystal growth. Due to heat of crystallization, the temperature rises to about 79° F. at the exit from this conduit. The resulting blend was pourable and illustrated eutectic characteristics as reported in Example 1. This pourable blend was then subjected to viscosity measurements at different temperatures. Viscosity measurements were made in the manner taught by U.S. Pat. No. 3,443,966. A Brookfield Viscometer, utilizing spindle No. 3 and one-half revolutions per minute, was used to make the viscosity measurements. Viscosity as a function of temperature was taken on the same basis as in U.S. Pat. No. 3,443,966. The viscosity of the eutectic blend according to the invention was 21,000 centipoise at 74.9° F. In order to generally assess viscosities of a stored product, the blend was allowed to remain undisturbed for 24 hours at 70° F., after which viscosity measurements were again taken in the same manner. At 75.1° F., the viscosity was 38,000 centipoise.

EXAMPLE 3

Figure 2:
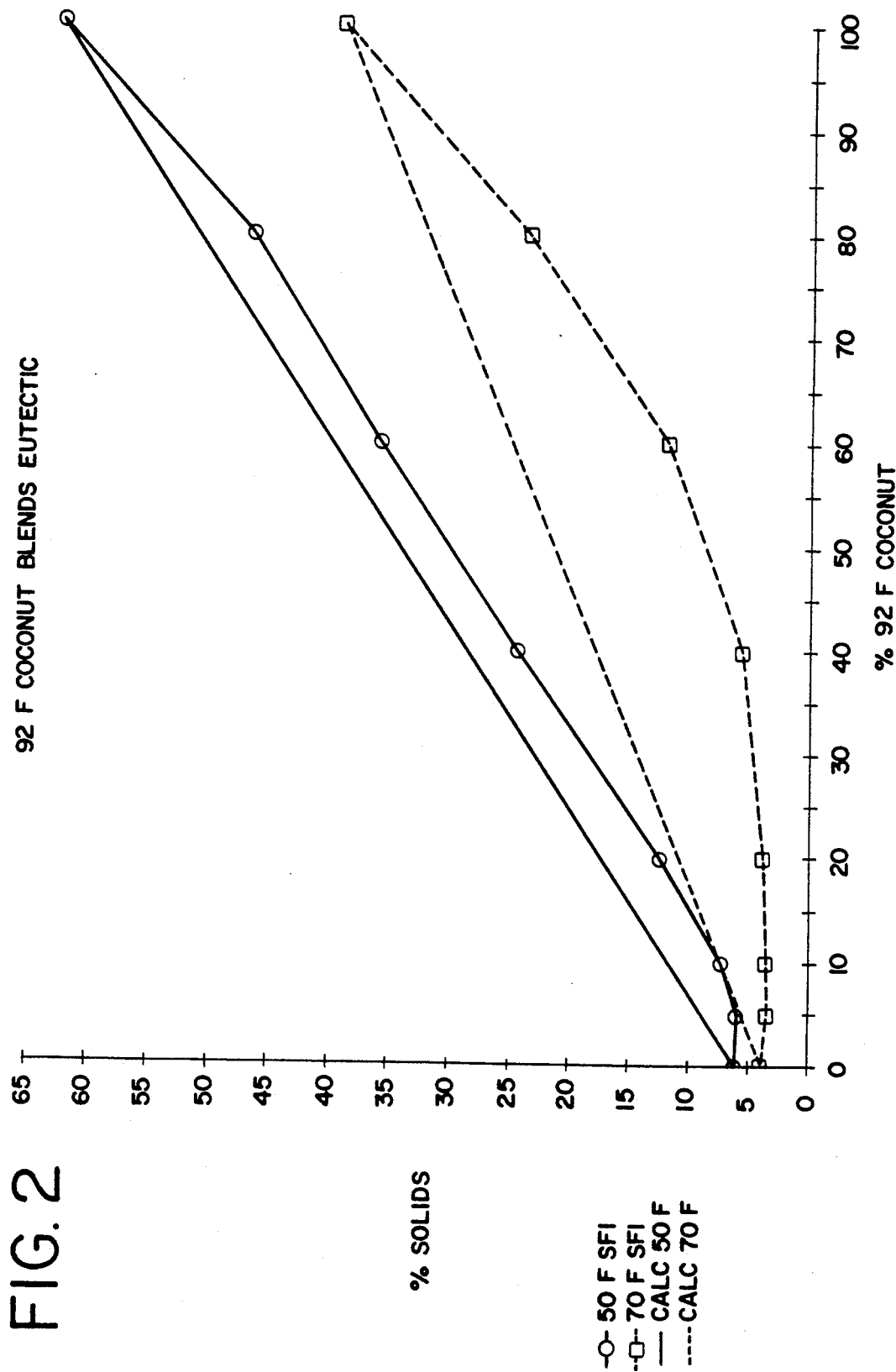
FIG. 2 is a plot of data illustrating the eutectic effect of the present invention for a higher melting point coconut oil lauric fat component.

Blends of a soybean oil component and a coconut oil lauric fat component at different blend ratios were prepared and subjected to solids fat index (SFI) testing and evaluation. The soybean oil component comprised soybean oil having an Iodine Value of 102, combined with low levels of soy flake approximating 3% of the soybean oil component. The lauric fat component was regular (76° F. melting point) coconut oil. SFI values were calculated, generally in accordance with Example 1, both at 50° F. and at 70° F. Actual SFI values for the blends were also taken at these two temperatures. The results are plotted in FIG. 1. The eutectic characteristic is apparent by the significantly lower solids percentages for the actually measured data, particularly at the lower levels of coconut oil lauric fat component percentages. A similar plot of data is shown in FIG. 2. Here, the coconut oil lauric fat component was hydrogenated coconut oil having a melting point of about 92° F.

It will be understood that the embodiments of the present invention which have been described are illustrative of some of the applications of the principles of the present invention. Numerous modifications may be made by those skilled in the art without departing from the true spirit and scope of the invention.

I claim:

1. A ready-to-use pourable shortening composition that contains a lauric fat component, the shortening composition comprising:
   at least about 70 weight percent, based upon the total weight of the shortening composition, of an edible liquid shortening base component, said edible liquid shortening base component having solids fat index values which are a function of temperature, the liquid shortening base component having an Iodine Value in excess of 85;
   between about 5 and about 30 weight percent, based upon the total weight of the shortening composition, of a lauric fat component, said lauric fat component having solids fat index values which are a function of temperature; and
   said shortening composition that is a combination of said edible shortening base component and of said lauric fat component has a eutectic characteristic wherein said shortening composition is pourable at a temperature within an ambient temperature range, including room temperature and below, and wherein said shortening composition has a solids fat index value that is substantially lower than a sum of said respective solids fat index values of said edible liquid shortening base component and of said lauric fat component within said ambient temperature range.

2. The shortening composition according to claim 1, wherein said lauric fat component is coconut oil.

3. The shortening composition according to claim 2, wherein said coconut oil is present in the shortening composition in an amount between about 10 and about 30 weight percent, based upon the total weight of the shortening composition.

4. The shortening composition according to claim 1, wherein said lauric fat component is coconut oil present in the shortening composition in an amount between about 5 and about 15 weight percent, based upon the total weight of the shortening composition.

5. The shortening composition according to claim 1, wherein said lauric fat component is present in the shortening composition in an amount between about 5 and about 25 weight percent, based upon the total weight of the shortening composition.

6. The shortening composition according to claim 1, wherein said edible liquid shortening base component is a pourable vegetable oil component in combination with a vegetable oil flake component comprising not more than about 12 weight percent of the liquid shortening base component.

7. The shortening composition according to claim 11 wherein said edible liquid shortening base component is present at between about 85 and about 95 weight percent, and said lauric fat component is present at between about 5 and about 15 weight percent, both based upon the total weight of the shortening composition.

8. The shortening composition according to claim 1, wherein the solids fat index value of the pourable composition is significantly lower than said sum of the respective solids fat index values of the edible liquid shortening base component and of the lauric fat component at a temperature within said ambient temperature range.

9. The shortening composition according to claim 8, wherein the significantly lower solids fat index value is exhibited when the shortening composition is at a temperature of between about 50° F. and about 80° F.

10. The shortening composition according to claim 8, wherein the significantly lower solids fat index value is exhibited when the shortening composition is at a temperature of between about 50° F. and about 70° F.

11. The shortening composition according to claim 1, wherein the solids fat index value of the pourable shortening composition is at least about 10% lower than said sum of the respective solids fat index values of the shortening base component and of the lauric fat component at a temperature within said ambient temperature range.

12. The shortening composition according to claim 1, wherein the solids fat index value of the pourable shortening composition is at least about 20% lower than said sum of the respective solids fat index values of the shortening base component and of the lauric fat component at a temperature within said ambient temperature range.

13. The shortening composition according to claim 1, wherein the solids fat index value of the pourable shortening composition is at least about 35% lower than said sum of the respective solids fat index values of the shortening base component and of the lauric fat component at a temperature within said ambient temperature range.

14. The shortening composition according to claim 1, wherein said composition exhibits a eutectic solids profile with temperatures between about 50° F. and about 80° F.

15. A method for formulating a ready-to-use shortening composition that is pourable at a temperature within an ambient temperature range including room temperature and below, the method comprising the steps of:
   blending at least about 70 weight percent, based upon the total weight of the pourable shortening composition, of an edible liquid shortening base component, together with between about 5 and about 30 weight percent, based upon the total weight of the pourable shortening composition, of a lauric fat component;
   whereby the solids fat index value of the pourable shortening composition is lowered to a value that is lower than the combined respective solids fat index values of the edible liquid shortening base component and of the lauric fat component at a temperature which is within said ambient temperature range.

16. The method according to claim 15, wherein said blending step further includes adding up to about 12 weight percent of an edible oil flake component, and wherein said lowering step reduces the solids fat index value of the shortening composition to less than the combined respective solids fat index values of the edible liquid shortening base component, of the lauric fat component, and of the flake component.

17. The method according to claim 15, wherein said ambient temperature range is between about 50° F. and about 80° F.

18. The method according to claim 15, wherein said ambient temperature range is between about 50° F. and about 70° F.

19. The method according to claim 15, wherein said lauric fat component is coconut oil.

20. The method according to claim 15, wherein said lauric fat component is present in the pourable shortening composition at between about 5 and about 15 weight percent, based on the total weight of the pourable shortening composition.

* * * * *

UNITED STATES PATENT AND TRADEMARK OFFICE
CERTIFICATE OF CORRECTION

PATENT NO. : 5,268,191
DATED : December 7, 1993
INVENTOR(S) : Thomas G. Crosby

It is certified that error appears in the above-indentified patent and that said Letters Patent is hereby corrected as shown below:

On the title page:
In "References Cited" U.S. Patent Documents, please
include --3,443,966  5/1969   Reid       99/118;
        3,595,674   7/1971   Shaffer et al  99/118;
        3,857,985  12/1974   Reid et al  426/362;
        4,359,482  11/1982   Crosby      426/606;
        4,384,008   5/1983   Millisor    426/613;
        4,960,606  10/1990   Crosby      426/602;
        4,961,951  10/1990   Crosby      426/602--.
Col. 1, line 44, "gimming" should read --gumming--;
      lines 50-51, "can pumped" should read --can be pumped--.
Col. 3, line 20, "safflover" should read --safflower--;
      lines 34-35, "base-shortening" should read --base shortening--.
Col. 5, line 61, "providing" should read --provided--.
Col. 8, line 10, "claim 11" should read --claim 1--.

Signed and Sealed this

Third Day of October, 1995

*Attest:*

BRUCE LEHMAN

*Attesting Officer*   *Commissioner of Patents and Trademarks*